US006907113B1

(12) United States Patent
Holm et al.

(10) Patent No.: US 6,907,113 B1
(45) Date of Patent: Jun. 14, 2005

(54) METHOD AND ARRANGEMENT FOR PROVIDING CUSTOMIZED AUDIO CHARACTERISTICS TO CELLULAR TERMINALS

(75) Inventors: Jukka Holm, Tampere (FI); Matti Hämäläinen, Lempäälä (FI); David P. Williams, Alton (GB); Janne Aaltonen, Turku (FI); Ari Ikonen, Raisio (FI)

(73) Assignee: Nokia Corporation (FI)

( * ) Notice: Subject to any disclaimer, the term of this patent is extended or adjusted under 35 U.S.C. 154(b) by 341 days.

(21) Appl. No.: 10/070,055

(22) PCT Filed: Aug. 31, 2000

(86) PCT No.: PCT/FI00/00737

§ 371 (c)(1), (2), (4) Date: May 29, 2002

(87) PCT Pub. No.: WO01/16931

PCT Pub. Date: Mar. 8, 2001

(30) Foreign Application Priority Data

Sep. 1, 1999 (FI) ............................................ 19991865

(51) Int. Cl.[7] ................................................ H04M 1/64

(52) U.S. Cl. .............................. 379/88.23; 379/373.02; 455/401; 455/412.1; 84/645

(58) Field of Search ........................... 379/88.16, 88.17, 379/88.22, 88.25, 261.61, 201.12, 372–374.02, 179, 180, 375.01; 455/401, 412.1, 412.2, 414.1, 415; 84/645; 700/83; 704/200.1, 503, 504; 380/200, 210, 217

(56) References Cited

U.S. PATENT DOCUMENTS 5,734,119 A 3/1998 France et al.
5,931,901 A 8/1999 Wolfe et al.
6,292,668 B1 * 9/2001 Alanara et al. ............. 455/466
6,370,389 B1 * 4/2002 Isomursu et al. ........... 455/466
2002/0016748 A1 * 2/2002 Emodi et al. ................. 705/26
2002/0087656 A1 * 7/2002 Gargiulo et al. ............ 709/217
2002/0152091 A1 * 10/2002 Nagaoka et al. ............... 705/1
2003/0050837 A1 * 3/2003 Kim ............................ 705/14
2003/0109251 A1 * 6/2003 Fujito et al. ................ 455/414
2003/0148789 A1 * 8/2003 Hendra ....................... 455/557

FOREIGN PATENT DOCUMENTS

| | | |
|---|---|---|
| EP | 0685972 A2 | 12/1995 |
| EP | 0777208 A1 | 6/1997 |
| EP | 0837451 A1 | 4/1998 |
| EP | 0851649 A2 | 7/1998 |
| WO | WO 95/28044 | 10/1995 |
| WO | WO 97/17776 | 5/1997 |
| WO | WO 97/30549 | 8/1997 |
| WO | WO 98/19480 | 5/1998 |
| WO | WO 01/11603 A1 | 2/2001 |

* cited by examiner

*Primary Examiner*—Roland G. Foster
(74) *Attorney, Agent, or Firm*—Perman & Green, LLP

(57) ABSTRACT

A method is provided for downloading audio characteristics to terminal equipment. A score information part (101, 302, 303) is provided describing the presentation instructions of an audible signal. An instrument information part (104, 305, 306) is also provided describing the parameters for synthesizing an audible signal the presentation instructions of which is described by said score information part. Additionally some compatibility information (123, 210, 211, 212, 220, 315) is provided describing the compatibility of said score information part and said instrument information part with certain processing and storing capacity. As a response to a selection command (411, 418), (412, 419) said score information part and said instrument information part are downloaded to terminal equipment through a communication network.

23 Claims, 7 Drawing Sheets

Figure 1:
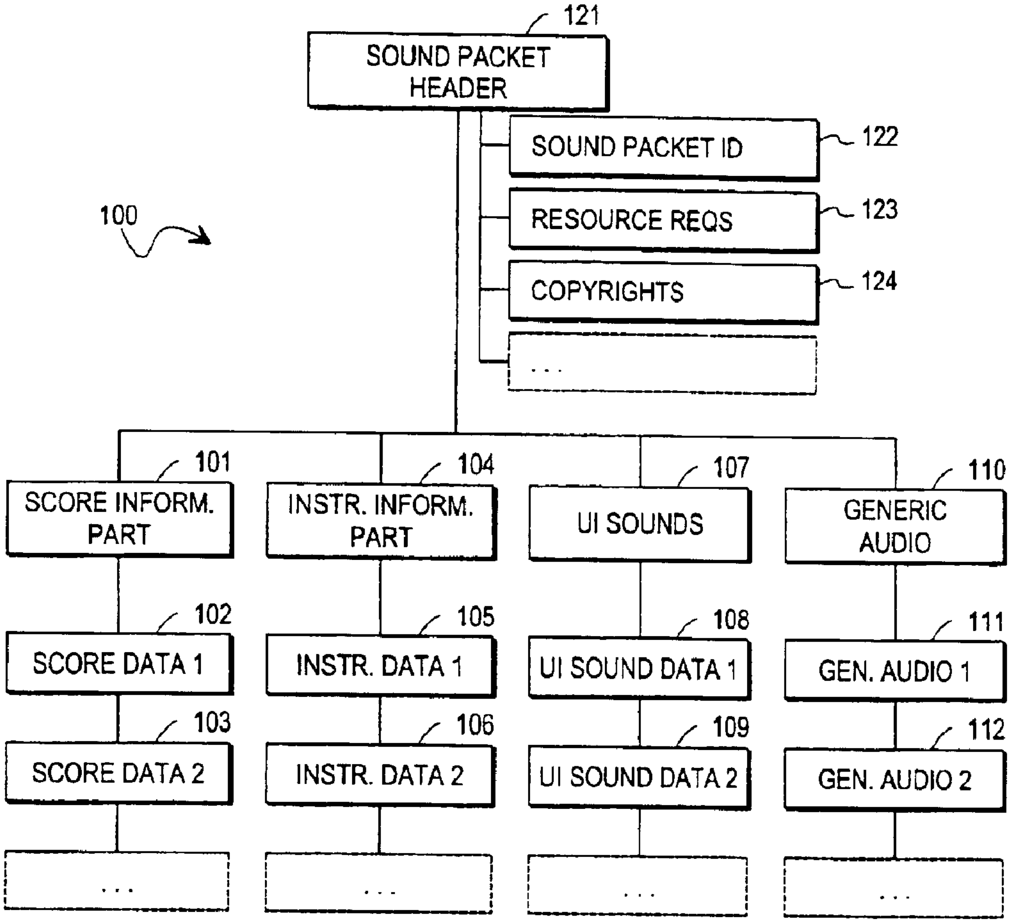

METHOD AND ARRANGEMENT FOR PROVIDING CUSTOMIZED AUDIO CHARACTERISTICS TO CELLULAR TERMINALS

This application claims the benefit of the earlier filed International Application No. PCT/FI00/00737, International Filing Date, Aug. 31, 2000, which designated the United States of America, and which international application was published under PCT Article 21(2) in English as WO Publication No. WO 01/16931 A1.

The invention concerns generally the technological field of furnishing terminal equipment of communication systems with selectable audio characteristics. Especially the invention concerns a method and arrangement for providing a large degree of selectability to individual users concerning ringing tones and other sounds emitted by their terminal equipment.

Portable terminals of cellular radio systems have conventionally been mobile telephones, but the development trend at the priority date of this patent application is towards more versatile terminal equipment with features from e.g. palmtop computers, telephones, positioning devices and personal digital assistants (PDAs). The conventional way of producing a ringing tone in a portable terminal is to use a buzzer which is optimized for efficiency in producing a high output sound pressure level. The buzzers that are most commonly used only accept a single square wave as an input waveform. A square input wave on a constant frequency gives rise to a monophonic output buzz with constant pitch. It is possible to play simple monophonic melodies with the buzzer by composing the input signal as a sequence of relatively short square wave trains. It is possible to use the loudspeaker of the mobile terminal to emit more versatile sounds, but in practice it may be difficult to obtain a reasonably high output sound pressure level without sacrificing compact size, efficiency in energy consumption and usability in the telephone mode.

Manufacturers have conventionally provided their mobile terminals with a selection of alternative ringing tones by storing a number of different buzzer input sequences into the terminal's memory. A user can select one of these preprogrammed tones by performing a simple programming step. Practical experience has shown that consumers are eager to personalize their mobile terminals according to their own taste, which has led to a phenomenal success of services that sell downloadable ringing tones. The known method of downloading a ringing tone from a network requires the user to send an SMS message (Short Messaging Services) to a certain ringing tone server coupled to the fixed parts of the cellular network, said message indicating the user's willingness to download a new ringing tone and preferably also identifying a particular melody which the user is interested in. The server responds with a specifically formatted SMS message that contains machine-readable instructions which the portable terminal can use to reproduce the ringing tone in question.

Although the selectability and downloading services described above has concentrated on ringing tones, it would be possible to use similar methods and arrangements to select personal tones or melodies for all occasions when the portable terminal emits an indicatory audio signal. Such occasions comprise but are not limited to indicator tones for key depressing, alarm sounds for battery depletion and other threatening events as well as amusing sounds for games.

The drawbacks of the prior art arrangements for providing selectability to portable terminals' audio characteristics are related to the limited sound reproduction capability on one hand and to the shortage of various resources on the other. With resources we mean the memory space and allocatable processing capability of the portable terminal itself as well as the allocatable transmission resources between the terminal and the fixed parts of the cellular radio network. We will illustrate the resource question with some examples.

At the priority date of this patent application one of the most popular ways of distributing arbitrary high quality audio sequences in electronic form is MP3 or MPEG-2 Layer 3 coded audio, where MPEG originally comes from Motion Picture Experts Group. The MP3 audio encoding is based on a method where an original audio sequence is recorded, digitized and compressed by performing a number of mathematical transformations on short consecutive frames of the digitized signal. One minute of MP3 encoded audio signal results in approximately 8 Mbits of data depending on the used compression rate. If we set the minimum temporal length of a ringing tone at ten seconds, a single melody would require over 1.3 Mbits of memory when stored. This is far too much regarding the limited amount of memory allocatable to ringing tones in known portable terminals. The downloading of such a ten-second audio sequence over the known GSM (Global System for Mobile telecommunications) digital cellular network at 9.6 kbit/s would take well over two minutes, which is unacceptable in terms of network loading and communication cost. Decoding an MP3 encoded bitstream into a for suitable for playback requires quite intensive processing.

At the priority date of this patent application there is one portable terminal on the market, known by the registered trademark "Nokia 9110 Communicator" of Nokia Corporation, that supports the playback of arbitrary audio tones encoded by Pulse Code Modulation or PCM. A typical 8-bit PCM encoded wave file that represents ten seconds of emitted signal with relatively low audio quality has the size of 640 kbits. Although this is considerably less than what is required by the MP3 encoded sequence, it is still too much for large-scale downloading.

It is an object of the present invention to provide a method and an arrangement for offering a wide variety of selectable audio characteristics to the users of terminal equipment with reasonable requirements concerning memory space, processing capability and transmission resources. It is a further object of the invention to provide compatibility of the method and arrangement with a large selection of terminal types and operating software. An additional object of the invention is to make it easy for the user to tailor the audio characteristics of terminal equipment according to personal taste.

The objects of the invention are achieved by presenting audio sequences in a form with a score information part and an instrument information part. The instrument information part contains synthesis parameters that define the timbre, or the synthesized sound or sequence of sounds. The score information part contains instructions that define the usage of the instrument information. Additionally there is provided compatibility information describing the compatibility of such audio sequences with known terminal capabilities.

The method according to the first embodiment of the invention is characterized in that it comprises the steps of

- providing a score information part describing the presentation instructions of an audible signal,
- providing an instrument information part describing the parameters for synthesizing an audible signal the presentation instructions of which is described by said score information part, providing compatibility information describing the compatibility of said score information part and said instrument information part with certain processing and storing capacity and as a response to a selection command, downloading said score information part and said instrument information part to terminal equipment through a communication network.

The method according to the second embodiment of the invention is characterized in that it comprises the steps of indicating the type of terminal equipment to a network, receiving from the network information concerning available score information parts, each of them describing the presentation instructions of an audible signal, and instrument information parts, each of them describing the parameters for synthesizing an audible signal the presentation instructions of which is described by a score information part, indicating at least one score information part and at least one instrument information part from said available score information parts and instrument information parts as selected, and receiving the score information part and the instrument information part indicated as selected from the network.

The invention also applies to an apparatus which comprises a network device. It is characterized in that the network device comprises a database of score information parts, each score information part describing the presentation instructions of an audible signal, a database of instrument information parts, each instrument information part describing the parameters for synthesizing an audible signal the presentation instructions of which is described by a score information part, compatibility information associated with said score information parts and instrument information parts, describing the compatibility of said score information parts and said instrument information parts with certain processing and storing capacity and means for responding to a selection command by downloading a score information part and a instrument information part to terminal equipment through a communication network.

According to the invention a service provider or a similarly acting other body maintains a database that comprises a plurality of sound packets. A sound packet is understood in this context as an entity that comprises a piece of musical score information and a set of parameters that relate to the "instruments" or synthesized sound sources which should be used to play the score. A sound packet is preferably self-contained in the sense that once it has been loaded into terminal equipment with appropriate processing and audio outputting capabilities, it enables the terminal to output a certain passage of audio signal where the synthesized sounds described by the parameters perform the presentation written into the score information. Said database contains also information about the compatibility of the stored sound packets with the capabilities of known terminal types. For downloading into a certain terminal equipment of known type only those sound packets are made available that do not exceed the terminal's capabilities.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Figure 2A:
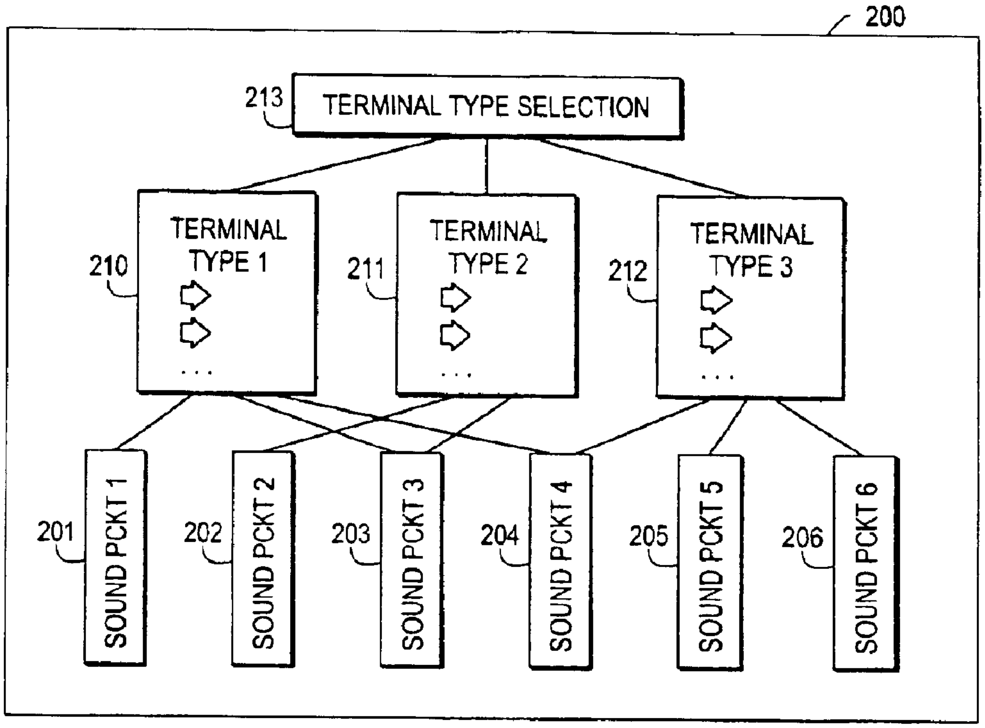
Figure 2B:
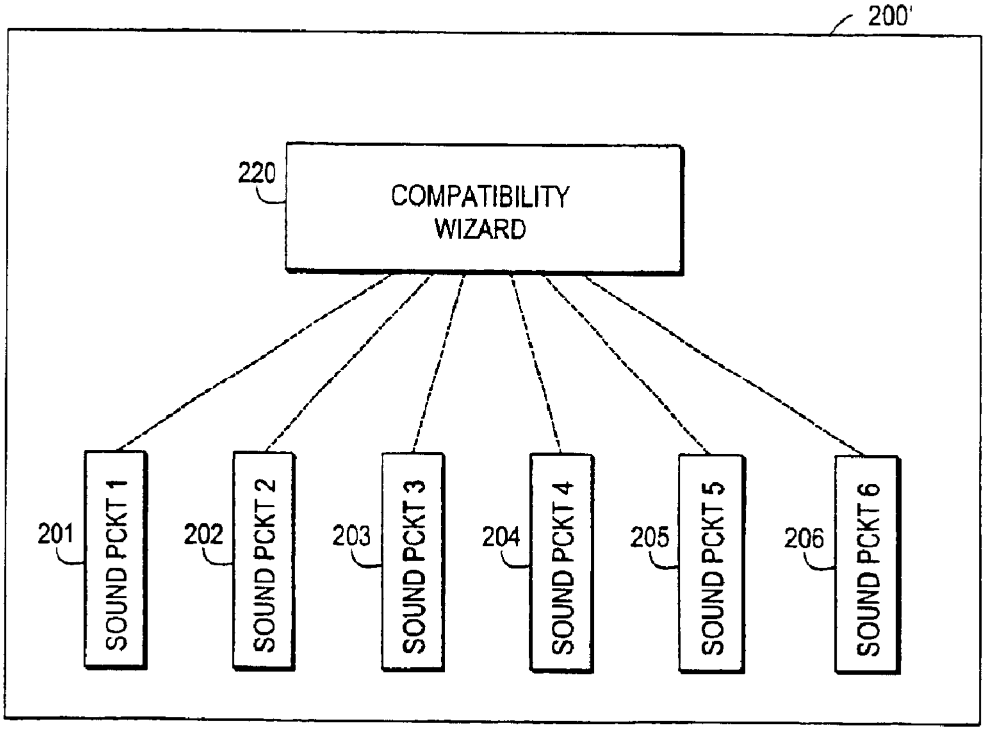
Figure 3:
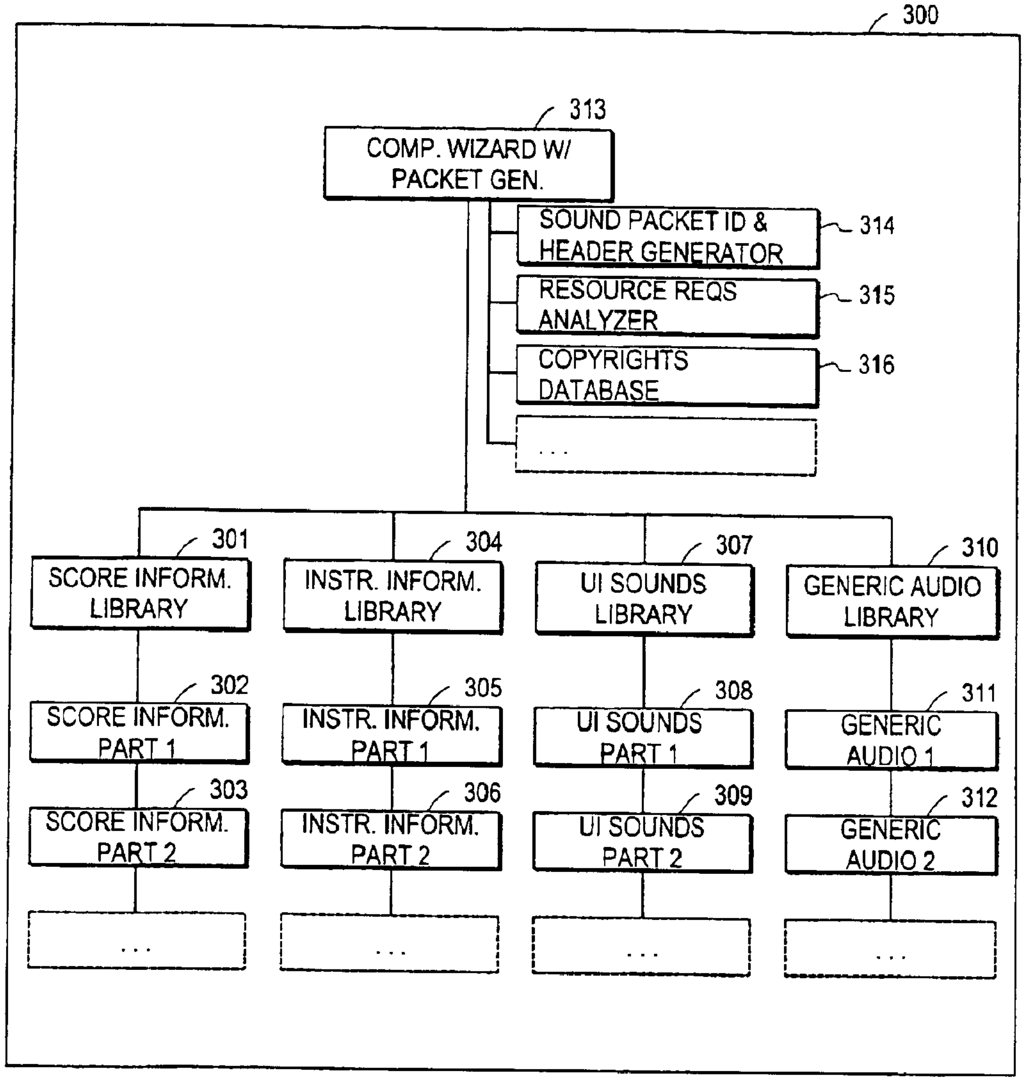
Figure 4:
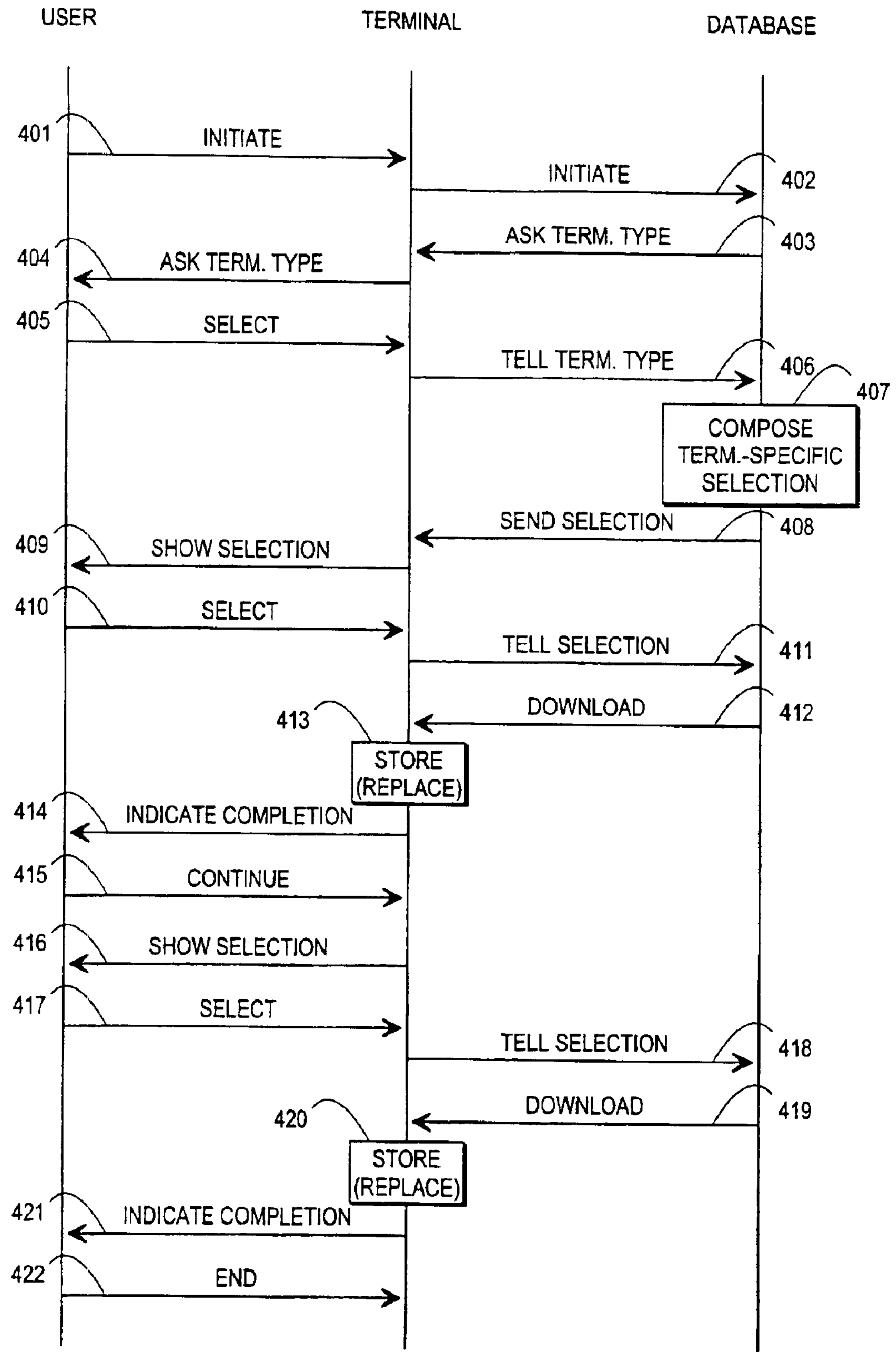
Figure 5A:
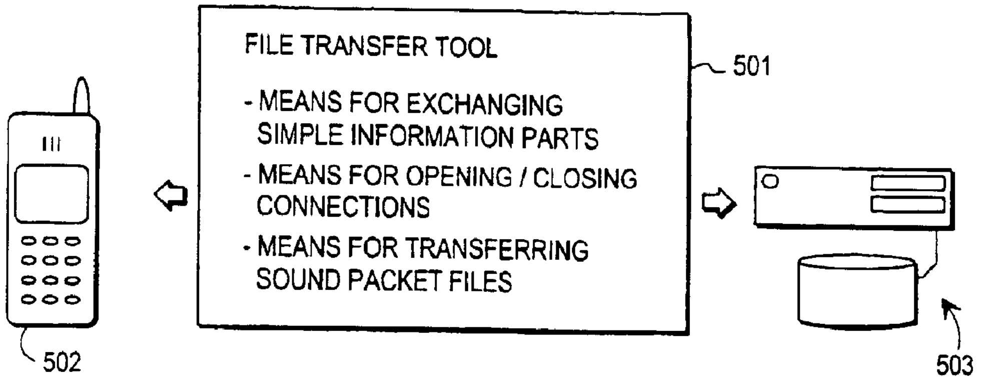
Figure 5B:
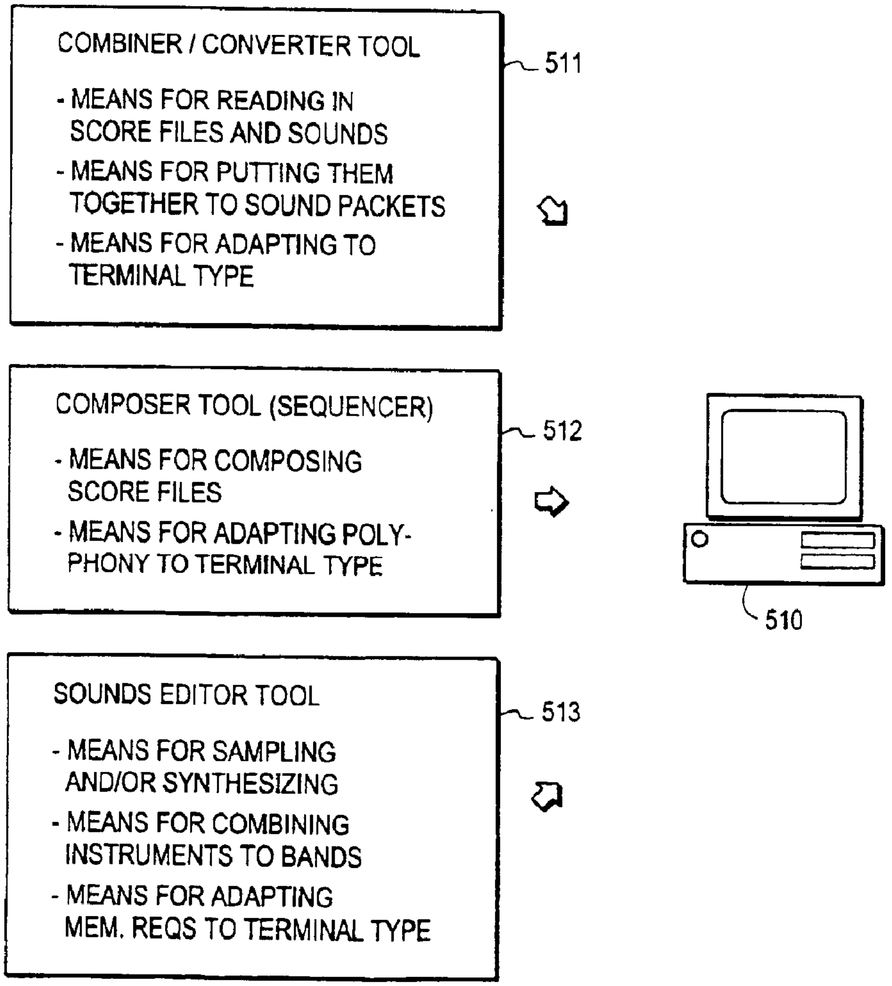
Figure 6:
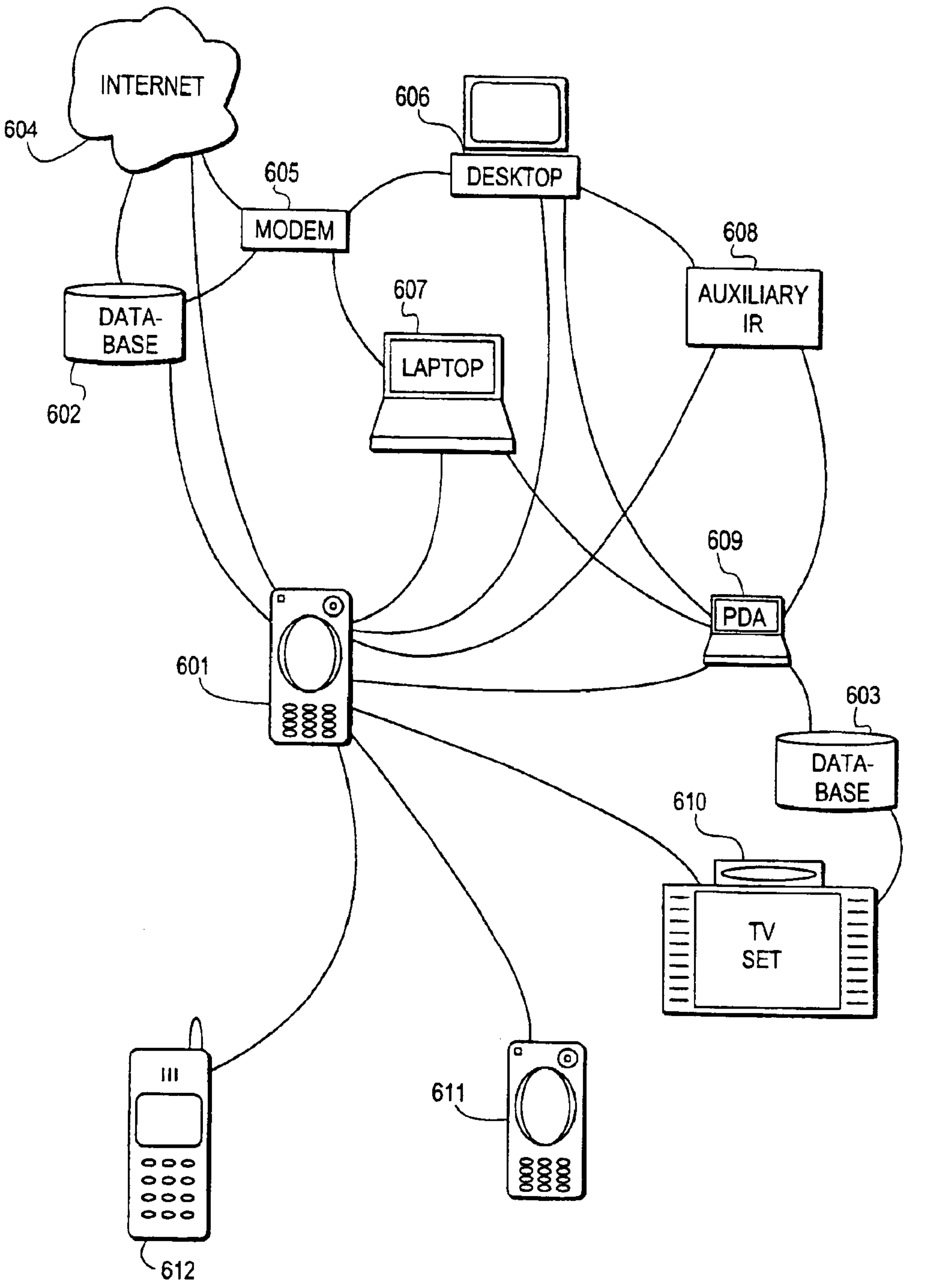
Figure 7:
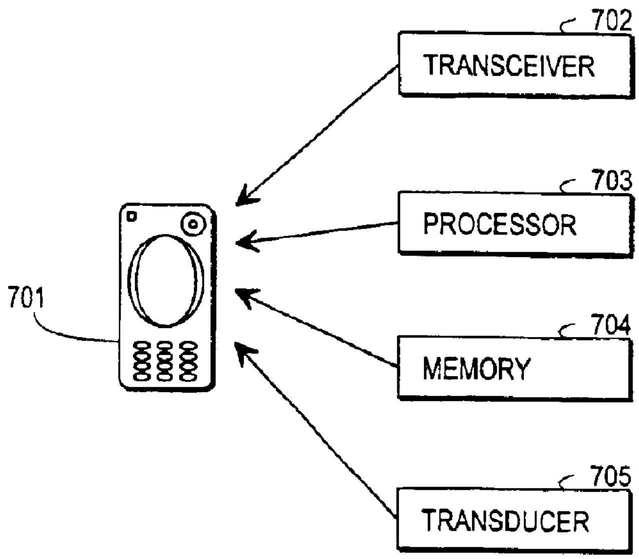
Figure 8:
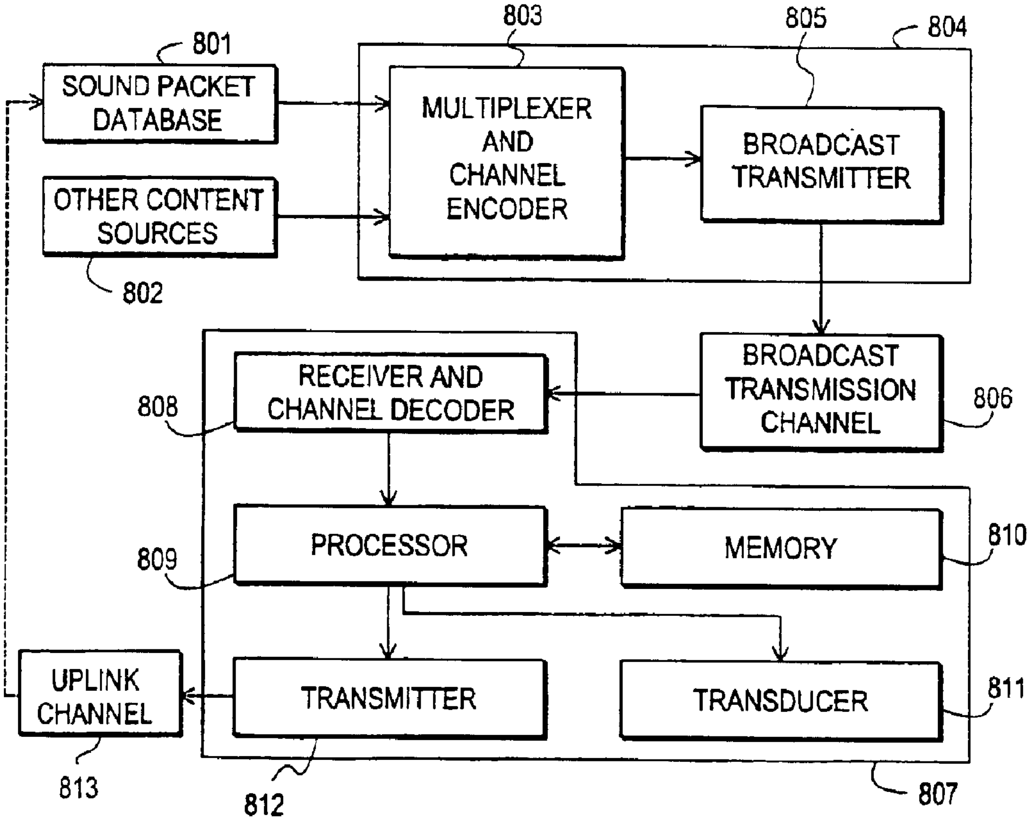

FIG. 1 illustrates the structure of a sound packet according to an advantageous embodiment of the invention, FIG. 2*a* illustrates an advantageous database arrangement, FIG. 2*b* illustrates another advantageous database arrangement, FIG. 3 illustrates an alternative database arrangement, FIG. 4 is a flow diagram of a method according to the invention, FIG. 5*a* illustrates a software tool for applying the invention, FIG. 5*b* illustrates further software tools for applying the invention, FIG. 6 illustrates some communication connections that can be used for applying the invention, FIG. 7 illustrates some pieces of hardware in a terminal according to the invention and FIG. 8 illustrates a broadcasting-based embodiment of the invention.

The idea of organizing a piece of music electronically into a score information part and a parameter or instrument information part is known as such. In the following we will first describe some known solutions of this kind.

Within the field of musical synthesizers there are known the concepts of patches and patch maps. Each stored synthesized instrument sound is designated with an associated patch number, and the table that correlates patch numbers with instruments is known as the patch map. One of the major standards controlling musical synthesizing and exchange of information related thereto between electronic devices is MDI (Musical Instrument Digital Interface). It is possible to compose a piece of synthesized music with one synthesizer and transfer it in digital form into another synthesizer. The digital representation of the piece of music contains information about e.g. which patch number(s) should be associated with each individual "channel" or voice in a musical score. If a receiving synthesizer uses the same patch map as the one with which the piece was composed, it is able to playback the piece exactly as it was at the composing stage. Within MIDI the most commonly used standard for instrument mapping is known as the GM or General MIDI. Known extensions to it are known as XG, GS and GM 2.0.

None of these instrument mapping standards actually describes how the actual instrument voice should be produced. Known sound synthesis technologies are e.g. FM (Frequency Modulation), wavetable synthesis and physical modelling.

For downloading sounds that can be associated to patch numbers in a patch map a SoundFont® file format has been introduced by Creative Labs Corporation where a collection of 16-bit digital samples is associated with synthesis information required to articulate the digital signal in the audio domain. The MIDI Manufacturers Association or MMA has also introduced a sound sample downloading format known as Downloadable Sounds level 1 (DLS-1). Recently these sound downloading formats have been merged into a new standard known as DLS-2. It is also known as SASBF or Structured Audio Sample Bank Format within the MPEG-4 multimedia standard. Commercial implementations of DLS-2 do not exist at the priority date of this patent application.

Staccato Systems Inc. has introduced an audio technology known as SynthScript® Down Loadable Algorithms or DLA, which is based on physical modelling of instrument voices. A processing engine known as the SynthCore® is required to convert a SynthScriptDLA text file into playing music. The processing engine also supports the GM, XG and DLS-1 synthesis mechanisms referred to above.

Additionally there is known a musical data file format known as the Rich Music Format or RMF. It determines how a single file format can be used to incorporate all sample, performance and copyright information of a piece of music. The performance portion is based on the MIDI file model with some extended control functions.

Although the above-described methods and arrangements for representing audio sequences are known to the public at the priority date of the present patent application, they are not directly applicable to ringtone and other audio characteristics download services for portable terminal. In the following we describe the method and apparatus according to the invention, making use of the above-mentioned known concepts at appropriate points.

FIG. 1 illustrates the conceptual composition of a sound packet according to an advantageous embodiment of the invention. The sound packet 100 comprises a score information part 101 which may be regarded as a song book or music case that contains the notes which should be played and relate synthesis instructions. The score information part may consist of score data subparts 102, 103 each of which comprises the score of a single song. Each score data subpart may further comprise sub-subparts each of which comprises the score of a single voice in that song. Additionally the sound packet comprises a instrument information part 104 which contains the instrument data, i.e. the parameters that a musical synthesizer needs to set up the “band” that should be used to play the score(s) contained in the score information part 101. These parameters are most advantageously organized into instrument data subparts 105, 106 so that each instrument data subpart defines a single instrument that may be used to play one or more of the voices defined by the score information subparts 102, 103.

Previously we have noted that the invention does not concern only the generation of ringing tones but it can be applied to the generation of other indicative audio signal as well. We may designate the latter class of voices generally as User Interface or UI sounds. In the embodiment of FIG. 1 the sound packet may comprise a UI sounds part 107 which again may consist of one or more UI sound data subparts 108, 109. Each UI sound data subpart 108, 109 is an entity, based on which the terminal equipment is able to generate a certain UI sound. Because the UI sounds are usually simple tones or very short melodies, the UI sound data subparts may be represented in very simple form that is different from score information. Naturally they can also be complete score data subparts like those 102, 103 shown under the score information part 101 so that an arbitrary piece of music can be performed as a UI sound by associating the score information contained in the UI sound data subpart(s) with corresponding instrument data subpart(s). It is also possible to have alternative instrument data subparts as UI sound data subparts so that the scores presented in the score information part produce either a ringing tone or some UI sound(s) depending on whether they are played with the “band” defined in the instrument information part 104 or the UI sounds part 107 respectively. An even further alternative is to have both score data subparts and instrument data subparts within the UI sounds part 107. If the invention is applied only to distribute and download ringing tones, the UI sounds part 107 and its subparts 108, 109 are not needed.

Additionally FIG. 1 shows an optional generic audio part 110 as a part of the sound packet. The generic audio part 110 may consists of generic audio subparts 111, 112 etc., each of which comprises a generic audio signal. The generic audio part 110 is included in the sound packet model to provide a possibility to transmit an arbitrary audio sequence or a number of such sequences as a part of the sound packet. The form of the generic audio part 110 or its subparts is not limited by the invention, but it can be e.g. MP3 or speech encoded with one of the speech encoding methods known in the field of speech processing. If the invention is applied only to distribute and download melodical ringing tones, the generic audio part 110 is not needed.

In order to facilitate the handling of sound packets it is advantageous to include into the sound packet structure a header part 121 which comprises general information like an identifier 122 of the sound packet, compatibility information 123 describing the compatibility of the sound packet with different known terminal types or just laying out some minimum allocatable resources (like processing capacity in MIPS and allocatable memory in kbits) required to use the sound packet, and copyright information 124 concerning the sound packet if applicable. The invention does not limit the contents of the header part 121.

A separate header part could also be included in each score information part 101, instrument information part 104, UI sounds part 107 and/or generic audio part 110, or even to every subpart and/or sub-subpart. Such header part could comprise e.g. specified copyright information and/or resource requirement information concerning only that part of the sound packet.

The sound packet approach illustrated in FIG. 1 differs from the known MIDI principle of downloading a piece of music mainly in that the instrument information part 104 that defines the “band” used to play the transmitted piece of music is contained within the same data struture 100 that in another part describes the actual music itself. In order to convey a MIDI music performance in its original form, the same patch map and the same set of instrument data has to be used for the synthesis of the music. Taken the considerable versatility and size of the patch maps of e.g. GM 2.0, a large number of the instrument descriptions would probably never be needed (a classical music enthusiast would probably never download a ringing tone that requires the instrument descriptions of heavy rock guitars). Furthermore, the number of different sounds needed for creative music is infinite. It is impossible to create a fixed collection of sounds that could satisfy the requirements of all musicians and content providers of the priority date of this patent application, not to mention the ever-expanding future requirements. The invention obviates the need for storing a large number of instrument descriptions in the limited memory space of a portable terminal. According to the preferable embodiment of the invention the parameter data parts that define the instruments are transmitted concerning only those instruments that are actually needed to perform the chosen pieces of music.

The size of a sound packet 100 in bits, as well as the processing capability required to playback the piece of music described therein in intended tempo, will depend heavily on the used synthesis technology, the accuracy and quality of the synthesized sounds, the diversity of the band or number of different instrument sounds, and the number of simultaneous voices, i.e. polyphony. It is possible to compose e.g. a very simple sound packet where only a single coarsely encoded instrument voice plays one or few notes, or an immensely complex sound packet where a doubled symphony orchestra with high-quality instrument voices performs a Wagner ouverture backwards in quadrupled tempo. The processing capacity required to decode and playback a sound packet is mostly determined by the degree of polyphony associated with the song to be played, i.e. the number of simultaneously playing voices.

A part of the invention is that it is somehow indicated, what are the resource requirements of a certain sound packet and/or which known terminal equipment types it is compatible with. Compatibility with a certain terminal equipment type means in this context that it is known that a normal terminal equipment of that type has enough allocatable memory and processing capability to download, store and playback that sound packet. Above we have noted that one way of indicating compatibility is to provide within the sound packet a header part where compatibility with known terminal types or the minimum amount of allocatable resources is explicitly recited. However, the compatibility information need not be an explicit part of the sound packet at all.

The invention does not limit the form of the score information part and the instrument information part, although it is regarded as advantageous to use a form taken from the above-mentioned existing standards. A score information part of a sound packet may be quite compact relative to the instrument information part. In practice, score information parts and instrument information parts are represented in differrent forms. It is possible e.g. to use the known SMS format, SAOL format or Csound score data format for scores, and a wavetable or physical modelling method for the instruments. It is also possible to use a common RMF or Rich Music Format file that encompasses both the score information part and the instrument information part.

FIG. 2*a* illustrates a structure of sound packets stored in a database schematically shown as 200. Said database is most advantageously maintained in a service provider's computer with fixed connections to a cellular radio network. The sound packets themselves 201, 202, 203, 204, 205 and 206 are most advantageously stored only once, i.e. only one copy (except for a potential back-up copy) of each sound packet appears in the database. In order to make only those sound packets available to a particular terminal type that are compatible with the allocatable resources in that terminal type the database or its associated handling functions comprises a terminal type selector block 213 as well as a number of terminal type blocks 211, 212 and 213. Each terminal type block is a collection of pointers where each pointer points to one sound packet which is known to be compatible with the terminal type in question. The idea behind this arrangement is that when a query is made to the database, it is first checked by the functions of block 213 whether the query comprises an indication of a particular terminal type. If such an indication is found, the appropriate terminal type block 211, 212 or 213 is called and the pointers in the called terminal type block are noted so that only those sound packets are made available for querying that are compatible with the terminal type in question. It is left to the discretion of eventual implementers to decide, whether a query with no terminal type indication is answered by making no sound packets available, by making all sound packets available or in some other way. The invention does not limit the number of sound packets or terminal type blocks in the database, or the number of pointer connections between a terminal type block and sound packets.

FIG. 2*b* illustrates an alternative database arrangement where a database 200' again comprises a number of sound packets 201, 202, 203, 204, 205 and 206. Instead of a terminal type based selection arrangement the database or its associated handling functions comprise a compatibility wizard 220. When a query is made to the database, the compatibility wizard 220 checks whether the query comprises an indication of allocatable memory space and processing capability. If such indications exist, the compatibility wizard 220 checks from the known capacity requirements of the sound packets 201, 202, 203, 204, 205 and 206 which of them are within the limits set by the indicated allocatable memory space and processing capability. The compatibility wizard 220 then makes only those sound packets available for querying that are compatible with the indicated allocatable resources. Other arrangements than those in FIGS. 2*a* and 2*b* are easily presented by persons skilled in the art for making a limited number of database entries available for querying when a query comprises an indication of limitations concerning the characteristics of the objects to be queried.

FIG. 3 illustrates an alternative, more versatile approach to implementing the database of sound packets with associated information about compatibility with terminal types or otherwise determined availability of resources. The database 300 does not consist of complete sound packets; instead, the sound packet components are separately stored in appropriate libraries, and sound packets are only assembled for delivery according to order. The score information library 301 comprises a number of score information parts 302, 303 each of which is analogous to the score information part 101 in FIG. 1. In other words each score information part in FIG. 3 may further comprise an arbitrary number of score data subparts and sub-subparts. In order to maintain graphical clarity these are not separately shown in FIG. 3. Similarly an instrument information library 304 comprises a number of instrument information parts 305, 306, each of which may further comprise an arbitrary number of instrument data subparts (not separately shown in FIG. 3), and a UI sounds library 307 comprises a number of UI sounds parts 308, 309, each of which may further comprise an arbitrary number of UI sound data subparts (not separately shown in FIG. 3). For completeness also a generic audio library 310 is shown. It may further comprise an arbitrary number of generic audio files 311, 312.

The operation of the database 300 in FIG. 3 is coordinated by a compatibility wizard and sound packet generator block 313 which may have a number of general information subblocks at its disposal. A sound packet ID and header generator block 314, a resource requirements analyzer block 315 and a copyrights database 316 are specifically shown in FIG. 3.

The database and function structure shown in FIG. 3 can be used for tailoring sound packets to the need and taste of individual users in a very versatile way. The compatibility wizard and sound packet generator block 313 is arranged to communicate with a user to find out the user's terminal type (or otherwise specified limitations concerning available resources), the selection of desired score(s) and the selection of desired instrumentation. Based on this information the compatibility wizard and sound packet generator block 313 is arranged to compose one or more sound packets by selecting the appropriate score information part(s) from the score information library 301, the appropriate instrument information part(s) from the instrument information library 304 and possibly the appropriate UI sounds part(s) and/or the appropriate generic audio parts from the corresponding libraries 307 and 310 respectively. Additionally the compatibility wizard and sound packet generator block 313 is arranged to check from the resource requirements analyzer block 315 that the resource requirements of the sound packet to be assembled do not exceed the capabilities of the terminal for which the sound packet is assembled. If the sound packet ordered by the user seems to become too complex for the available resources, the compatibility wizard and sound packet generator block 313 may be arranged to simplify it by e.g. reducing the degree of polyphony, changing wavetable resolution from 16 to 8 bits ar adjusting a sampling frequency. Such simplifying may take place with the explicit consent of the ordering user or automatically. The compatibility wizard and sound packet generator block 313 is also arranged to equip the sound packet with a suitable identifier, copyright information and other header constituents with the help of blocks 314 and 316.

Previously we have noted that a score information part corresponds roughly to a song book, a score data subpart corresponds to a song in the song book and a score data sub-subpart corresponds to the notes of a single voice in the song. In a very versatile embodiment following the database architecture of FIG. 3 there could be a score data subpart library or "song library" where the score data subparts are stored, and a score information part library where the score information parts would only consist of links to predetermined score data subparts in the library. The compatibility wizard and sound packet generator block 313 would then be arranged to either pick among the already made score information parts or to compose customized score information parts on the fly according to an order from a user.

Within the embodiment of FIG. 3 it would be advantageous to include a separate header field with e.g. copyright information into each score information part, instrument information part, UI sounds part and/or generic audio parts or even to every subpart and/or sub-subpart, because otherwise such part-related information would be rather difficult to manage.

FIG. 4 illustrates an exemplary method for downloading a sound packet from a database according to FIG. 2*a* or 2*b*. At step 401 the user initiates the procedure by e.g. starting a network browser application in his terminal and asking for a connection to a certain network address which he knows to lead to the homepage of the sound packet downloading service. At step 402 the terminal performs the corresponding action, which in the above-mentioned case means contacting the given network address in a way known as such. In FIG. 4 we have assumed that the connection request to the database does not as such reveal the terminal type, so at step 403 the database asks for it by e.g. sending a list of the terminal types it recognizes. At step 403 the list is displayed to the user who makes a selection at step 405; the selection is forwarded to the database at step 406.

It is possible to make the terminal type identification automatic in order to get rid of steps 403 to 406. The most straightforward way of doing this is to make the terminal send its type identification to the database already at step 402. The terminal type may be explicitly given, or the terminal may transmit for example its IMEI code (international Mobile Equipment Identifier) or a corresponding code a part of which is the serial number of the terminal. The manufacturers usually apply some systematics in appointing serial numbers to different terminal types so it may be possible to arrange the database to compare the transmitted serial number to a simple table and deduce the terminal type according to the range of serial numbers into which the transmitted terminal number falls. Another way of at least partly simplifying steps 403 to 406 is to make the database place its request 403 for the terminal type in such machine-readable form that the terminal does not need to bother the user with steps 404 and 405; the terminal could send its type-indicating answer 406 automatically.

In any case we assume that the database has become aware of the terminal type or otherwise specified limitations concerning allocatable capacity. At step 407 the database composes a selection list consisting of only those stored sound packets which are compatible with the indicated terminal type. At step 408 it sends the composed selection list to the terminal, which displays it to the user at step 409. The user makes his selection at step 410 and the terminal forwards it to the database at step 411. This triggers the actual downloading at step 412. The downloaded sound packet is stored into the memory of the terminal at step 413. If necessary, a previously stored sound packet is at the same time removed from the memory either automatically or after having asked the user for confirmation. The completion of the downloading is indicated to the user at step 414.

In FIG. 4 we have assumed that the user wants to download also another sound packet. Therefore he answers the completion indication 414 with a continuation command 415. The previously received selection information is still in the terminal's memory, so a new inquiry to the database is not needed before the terminal can again display the selection list at step 416. Steps 417 to 421 are exact copies of previously described steps 410 to 414. At step 422 the user ends the downloading by giving an appropriate command to the terminal.

On the basis of the method illustrated in FIG. 4 it is obvious to the person skilled in the art how to compose a similar method for downloading tailored sound packets from a database following the distributed principle of FIG. 3. More selection steps are needed than in the method of FIG. 4, and information may be exchanged between the user and the database about the available options in a situation where the user's selections appear to exceed his terminal's capacity. Otherwise the method follows the principles illustrated in FIG. 4.

FIGS. 5*a* and 5*b* give a schematic overview of the software tools that are required to implement an advantageous embodiment of the invention. FIG. 5*a* shows how a file transfer tool 501 should be implemented both in terminal equipment 502 and the computer station 503 which houses the sound packet database. The file transfer tool should be applicable for the fast and reliable transfer of small information parts like terminal types, as well as for opening and closing connections and for transferring the files that form the sound packets themselves. File transferring between terminal equipment and fixed computer stations is known as such, so it is well within the capabilities of a person skilled in the art to construct a software tool that may act as the file transfer tool 501 in FIG. 5*a*.

FIG. 5*b* illustrates some software tools that are mainly meant to run in a computer 510 rather than terminal equipment, although as the borderline between portable terminals of cellular radio systems and portable computers is getting blurred, this assumption is by no means limiting. A combiner/converter tool 511 is meant to be a basic tool for combining separate score files, instrument information and possibly separate UI sound sequences and generic audio files into sound packets. Conversions may be needed if the original files are in other formats than what are specified as the allowable information formats within a sound packet. The combiner/converter tool is mosty advantageously equipped with a compatibility unit that may not let the user to compose a certain sound packet if its memory or processing capacity requirements would be beyond the capabilities of a given terminal type or beyond explicitly given limiting values. At least the compatibility unit should be able to provide a completed sound packet with an identifier that either explicitly announces the suitability of the sound packet for certain terminal types or at least lays down the memory or processing capacity requirements thereof. It is assumed that using a combiner/converter tool 511 should not require specific musical expertise.

A composer tool or sequencer 512 also appears in FIG. 5*b*. It is the software tool for composing new music in machine-readable form. It too is most advantageously equipped with a compatibility unit, the role of which is to make sure that a certain score file will be possible to be played back taken the polyphonic capabilities of a certain terminal type, i.e. the processing capabilities available for processing a number of simultaneous voices. A sounds editor tool 513 is shown for producing new instrument data subparts and/or editing old ones, and for combining instrument data subparts into instrument information parts that represents bands. The invention does not limit the synthesis technology used by the sounds editor tool 513. A compatibility unit is again most advantageously provided for adapting the instrument information parts to the known amount of allocatable memory in known terminal types. Together the composer tool 512 and the sounds editor tool 513 form a set of advanced software tools that may require some audio expertise to be used successfully. The outputs of the composer tool 512 and sounds editor tool 513 can be used as the inputs of the combiner/converter tool 511.

FIG. 6 illustrates some communication connections that can be used as channels for downloading sound packets to terminal equipment 601 from one or several databases 602 and 603. If the database 602 is directly connected to a telephone network there may be a direct data call connection between it and the terminal equipment 601. If the database 602 is connected to the Internet 604 or corresponding widespread packet-switched communication network and the terminal equipment 601 is capable of packet radio services, the connection may take the form of a known Internet connection; in this embodiment the file transfer tool to be used between the terminal equipment 601 and the database would be a network browser. There may also be a connection from the Internet 604 through a modem 605 to a desktop computer 606 or a laptop computer 607 which may function as an intermediate stopping point for the sound packets. Once downloaded from the database into a "local" computer 606 or 607 a sound packet may be further transferred to the terminal equipment 601 either directly through a cable connection, an LPRF (Low Power Radio Frequency) link or infrared link, or using an intermediating auxiliary such as the infrared transceiver 608 in FIG. 6.

A personal digital assistant or PDA 609 may also be used to communicate a sound packet to the terminal equipment 601 by any means including but not being limited to data calls, infrared connections, LPRF connections and direct cable. The PDA 609 may have received the sound packet either directly from a database or from the devices 605, 606, 607 or 608 of the above-explained PC computer environment. Another possible sound packet communication channel is through a bidirectional TV/Set Top Box connection and a corresponding device 610. Naturally data calls, infrared connections, LPRF connections, direct cables and other means may be used to transfer sound packets from other portable terminals 611 or older mobile telephones 612.

FIG. 7 illustrates schematically the hardware requirements which the present invention sets to terminal equipment 701. A transceiver must be provided in order to establish and maintain the communication connections that are required to contact the databases or other devices from which a sound packet should be downloaded and to perform the actual downloading. Terminal equipment will by its nature comprise a radio transceiver, so the invention only requires that the data transfer capacity of the transceiver is high enough for transferring a sound packet in a reasonable time. Taken that the most advanced technology in portable terminals of the priority date of this patent application enable the transmission of real-time video, the capacity constraints for the transceiver 702 are not very demanding.

The terminal equipment 701 also needs to comprise a processor 703 with its associated circuitry so that it is able to convert the digital information contained within a sound packet into an audio frequency signal that can be lead to an acoustic transducer. The required processing capability is not exceptionally high if the previously explained file formats are used which have lower degree of polyphony than e.g. the minimum polyphony of the GM-1 or GM-2 specification. The same applies to the memory 704: as long as the sound packet approach is used to guarantee that only that information need to be stored that will actually be used for reproducing the desired acoustic functions, the memory technology of the priority date of this patent application suffices for implementing the required amount of memory into terminal equipment.

Finally the terminal equipment 701 needs to comprise an acoustic transducer 705 that is preferably more advanced than the monophonic square-wave driven buzzers of conventional mobile telephones. Constructing small-sized lightweight loudspeakers is not difficult as such, so it is merely a conventional engineering task to select a suitable transducer type and integrate it to the structures of the terminal equipment.

The architecture of the terminal equipment 701 must enable the communication of received information from the transceiver 702 to the processor 703 and further to the memory 704. Additionally the processor 703 must be able to read data from the memory 704 and to transmit it over the transceiver 702 to a cellular radio network. For emitting the audible signals represented in sound packets the processor 703 must be able to read stored sound packet data from the memory 704, to process it into an audio frequency signal and to direct the result to the transducer 705 for converting it into acoustic form. All these connections are easily implemented by a person skilled in the art.

We will conclude by discussing an alternative approach to the actual transmission of sound packets between a database coupled to a network and a number of terminals. Previously we have assumed that each downloading of a sound packet takes place at an explicit order from a certain terminal so that the sound packet is delivered to that terminal only. No actual limitations have been placed regarding the transmission channel but there is certain implicit pointing towards point-to-point connections through cellular radio networks and/or packet-switched communication networks between computers. However, it is possible to arrange for a broadcast-type delivery of sound packets either so that a certain collection of sound packets is transmitted at certain intervals irrespective of whether some terminal has ordered a transmission or not, or so that each terminal has at least a limited opportunity of influencing the selection of sound packets that is available through broadcasting.

FIG. 8 illustrates an arrangement where the sound packet database 801 is regarded equal to other content sources 802 of a broadcast-type transmission network. As an example of such a transmission network we may consider a digital television network that uses the known DVB (Digital Video Broadcasting) standard for transmitting multiplexed streams of digital data with a relatively high transmission capacity.

In that case the other content sources 802 could comprise e.g. movies read from a digital storage medium and online television programs recorded in a studio.

From the sound packet database 801 and the other content sources 802 there are connections to a multiplexing and channel encoding block 803 which is a part of a larger transmission station 804. Said multiplexing and channel encoding block 803 constructs a multiplexed transmission stream according to the employed standard(s), e.g. DVB, and feeds it into a broadcast transmitter 805, also known as the head-end. The multiplexed transmission stream is transmitted through a broadcast transmission channel 806 which may be e.g. a cable television network or a radio transmission system involving repeater stations in link masts and/or in satellites.

A terminal system 807 comprises a receiver 808 that is arranged to receive and at least partially decode the received multiplexed transmission stream. Partial decoding means in this context that the receiver may be able to decode one or few components of the multiplexed transmission stream even when it is unable to touch the other components. In this patent application we discuss the use of sound packets, so we may assume that the receiver and decoder block 808 is able to decode at least that part of the multiplexed transmission stream that contains the information originally obtained from the sound packet database 801. The decoded information is fed into a processor 809 and a memory 810, and based on this information the processor 809 is able to construct an audio frequency signal stream that is fed into the acoustic transducer 811 for outputting an acoustic signal. A receiving buffer may be needed between blocks 808 and 809.

Up to this point the arrangement of FIG. 8 has been unidirectional in the sense that no uplink channels from the terminal system 807 to the sound packet database 801 have been described. However, we may assume that at least in some embodiments the terminal system 807 comprises a transmitter 812, and an uplink channel 813 exists. It may go through the same network that implements the broadcast transmission channel 806, if the technology of bidirectionality known from the field of interactive television is used. Alternatively the uplink channel 813 may be completely independent, as is shown in FIG. 8, and go e.g. through a digital cellular packet-switched communications network or other known networks.

It should be noted that the terminal system 807 need not be a single device. It can involve two or more devices like a cable television receiver with integrated set-top box features and a mobile telephone. The local communication connection between them may exploit one or several of the short-range communication technologies referred to in association with FIG. 6 above. Although the mobile telephone is in such an arrangement implicitly taken to be the ultimate receiver of a sound packet, the invention does not preclude the use of the sound packet(s) also within the cable television receiver or other consumer electronic devices.

A unidirectional embodiment of distributing sound packets through an arrangement according to FIG. 8 could work as follows. The sound packet database 801 maintains the collection of data packets as described previously and feeds a selection of sound packets in the form of a digital input stream into the multiplexer and channel encoder block 803 according to a predetermined timetable. If the stored selection of sound packets in the database is very large, it may not be useful to transmit all of them through the broadcasting system, especially if the sound packet database is also accessible through the Internet or other bidirectional communication network for specified delivery orders. The sound packet database 801 could feed into the multiplexer and channel encoder block 803 a "top 100" selection of most popular sound packets or other limited subset of all stored sound packets. Alternatively or additionally the sound packet database 801 could feed into the multiplexer and channel encoder block 803 different subsets of stored sound packets as different components-to-be of the multiplexed transmission stream, so that e.g. rock'n roll sound packets would go into a different component than classical music sound packets, or sound packets only compatible with a certain terminal type A would go into a different component than sound packets only compatible with a certain other terminal type B.

An even further alternative is to feed into the multiplexer and channel encoder block 803 such sound packets that include sounds from the movies or other programs that are currently coming from the other content sources block 802. This would require some kind of synchronization in the operation of blocks 801 and 802. It could be commercially very attractive if a user who is enthusiastically watching a new music video or box office hit movie from television could simultaneously download the theme songs and/or the characters' key lines (like the notorious "I'll be back!" from a known American action movie) into his terminal equipment to be used as ringing tones and other sounds by simply activating the local communication link between the terminal equipment and the television set.

In any case the sound packets will be multiplexed and channel encoded into the transmission stream so that basically the same selection of sound packets is available to every terminal system, or at least to every terminal system having similar capabilities. It is then on the responsibility of the terminal system to screen the available selection of sound packets so that only compatible ones are presented as selectable options to the user, to perform the actual selection on the basis of user action and to store the selected sound packet to memory.

A simple "semi-bidirectional" embodiment of distributing sound packets through an arrangement according to FIG. 8 could work as follows. In the absence of any orders from the terminal systems the database 801 does not feed any sound packets into the multiplexer and channel encoder block 803, whereby the corresponding downlink broadcasting capacity is left free, or feeds into it a "top 100" group of sound packets as in the unidirectional embodiment, or feeds only selection information that the terminal system and its user may use to identify a desired sound packet. If the user of the terminal system is able to identify a sound packet that is not currently available but that could be ordered from the database 801, he uses the transmitter 812 to transmit a corresponding selection information to the database. As soon as the sound packet database 801 has received an order from a terminal system through an unidirectional uplink channel 813, it feeds the corresponding selected sound packet into the multiplexer and channel encoder block 803 instead of or in addition to the previously fed sound packets, if any. The ordered sound packet gets broadcast to multiple potentially receiving terminal systems. If it should be assured that only the recipient that ordered the packet is able to use it, the transmitter 812 may include an encryption key in the order message so that the database can encrypt the sound packet before transmission.

A more versatile and truly bidirectional arrangement could be such where the terminal system 807 and the sound packet database 801 conducted an initiation, terminal type identification and selection process like steps 401 to 411 in FIG. 4 over a bidirectional point-to-point channel, and only the selected sound packet would be broadcast. Also this embodiment could use encryption to ensure that only the correct recipient is able to actually use a certain delivered sound packet. The main advantage of the broadcasting system is its high capacity in transferring entities like larger sound packet files, so it is probably not advantageous to use the broadcasting channel for exchanging simple information like selections. A hybrid bidirectional embodiment could be otherwise like said truly bidirectional arrangement, but use the broadcast channel also for providing a large amount of information describing the sound packets available for downloading (i.e. for implementing steps 408 and 409 in FIG. 4).

An advantageous addition to the invention is the use of encryption to protect sound packets and/or their parts against illegal copying, editing or use after a predetermined time limit etc. The sound packets or their parts may be stored in the databases in already encrypted form, or the encryption may take place dynamically in association with the downloading to terminal equipment. The terminal equipment must naturally then be equipped with suitable decryption means. The use of encryption for protecting stored and/or transmitted pieces of digital data is known as such. The invention does not limit the nature or implementation of the encrypting—decrypting process.

Although we have in the foregoing discussed exclusively the possibility of storing audio-related presentation instructions to the score information parts, the invention may also be applied to the transfer of other kinds of presentation information, like midi-type control commands for lighting or synchronized karaoke words for the songs to be performed.

What is claimed is:

1. A method for downloading audio characteristics to terminal equipment, comprising the steps of:

providing a score information part describing the presentation instructions of an audible signals;

providing an instrument information part describing the parameters for synthesizing an audible signal the presentation instructions of which is described by said score information part;

providing compatibility information describing the compatibility of said score information part and said instrument information part with certain processing and storing capacity;

transmitting said score information part and said instrument information part towards terminal equipment;

wherein the step of transmitting said score information part and said instrument information part towards terminal equipment comprises the substeps of multiplexing said instrument information part into a digital information stream and broadcasting the resulting multiplexed digital information stream through a digital broadcasting network and multiplexing said score information part into said digital information stream together with said instrument information part before broadcasting the resulting multiplexed digital information stream through said digital broadcasting network;

producing a plurality of mutually different sound packets by selecting a certain score information part and a certain instrument information part into each sound packet;

multiplexing said plurality of sound packets into a digital information stream and broadcasting the resulting multiplexed digital information stream through a digital broadcasting network; and repeating said step of multiplexing and broadcasting for a number of times.

2. A method according to claim 1, additionally comprising the steps of:

identifying a piece of information related to said score information part and said instrument information part but coming from a different content source; and synchronizing the multiplexing of a score information part and an instrument information part into said digital information stream with the multiplexing of said related piece of information into said digital information stream.

3. A method according to claim 1, wherein the step of transmitting said score information part and said instrument information part towards terminal equipment additionally comprises the substep of multiplexing said compatibility information into said digital information stream together with said instrument information part and score information part before broadcasting the resulting multiplexed digital information stream through said digital broadcasting network.

4. A method according to claim 1, additionally comprising a step of receiving a piece of selection information from said terminal equipment, said selection information indicating said score information part and said instrument information part as being selected by said terminal equipment for downloading.

5. A method according to claim 1, wherein the substep of broadcasting the resulting multiplexed digital information stream through a digital broadcasting network comprises the step of broadcasting the resulting multiplexed digital information stream through a digital broadcasting network in a Digital Video Broadcasting form.

6. A method according to claim 1, wherein the step of downloading said score information part and said instrument information part to terminal equipment additionally comprises the substep of downloading said score information part to said terminal equipment through a point-to-point connection in a communication network.

7. A method according to claim 1, comprising the step of providing at least one of said score information part, instrument information part and compatibility information in encrypted form.

8. A method according to claim 1, wherein the step of downloading said score information part and said instrument information part to terminal equipment additionally comprises the substep of encrypting at least one of said score information part and instrument information part.

9. A method according to claim 1, additionally comprising the step of combining said score information part, said instrument information part and said compatibility information into a common sound packet structure, so that said step of transmitting said score information part and said instrument information part to terminal equipment corresponds to downloading said sound packet structure to terminal equipment.

10. A method according to claim 1, further comprising the steps of:

providing a user interface sounds information part describing a plurality of user interface sounds; and combining said user interface sounds information part to said sound packet structure prior to downloading said sound packet structure to terminal equipment.

11. A method according to claim 1, further comprising the steps of:

providing a generic audio part describing at least one arbitrary sound sequence; and combining said generic audio part to said sound packet structure prior to downloading said sound packet structure to terminal equipment.

12. A method according to claim 1, comprising the steps of:

providing a database of a plurality of sound packets;

as a response to a message from terminal equipment identifying the terminal equipment as being of a certain type, selecting from said database a number of sound packets the compatibility information of which shows them to be compatible with the known processing and storing capacity of terminal equipment of said certain type;

offering said selected number of sound packets to the terminal equipment as alternatives for selection; and as a response to said selection command, downloading a selected one of said selected number of sound packets to terminal equipment through a communication network.

13. A method according to claim 12, additionally comprising prior to the step of identifying the terminal equipment as being of a certain type the step of:

as a response to an initiation from said terminal equipment, requesting the terminal equipment to indicate its type.

14. A method according to claim 9, comprising prior to the step of combining said score information part, said instrument information part and said compatibility information into a common sound packet structure the step of:

providing a database comprising a number of score information parts in a score information library and a number of instrument information parts in an instrument information library.

15. A method according to claim 1, wherein the step of providing a score information part comprises the substep of providing a plurality of score data subparts each of which describes the presentation instructions of a single piece of music.

16. A method according to claim 15, wherein the step of providing a score information part comprises the substep of providing a score information part in a MIDI form.

17. A method according to claim 1, wherein the step of providing an instrument information part comprises the substep of providing a plurality of instrument data subparts each of which describes one instrument for synthesizing an audible signal the presentation instructions of which is described by said score information part.

18. A method according to claim 1, wherein the steps of providing a score information part and providing an instrument information part together constitute a superstep of generating a file in a Rich Music Format form.

19. A method according to claim 1, wherein the steps of providing a score information part and providing an instrument information part together constitute a superstep of generating a file in a MPEG-4 form.

20. An arrangement for downloading audio characteristics from a network to terminal equipment, said arrangement comprising a network device that in turn comprises:

a database of score information parts, each score information part describing the presentation instructions of an audible signal;

a database of instrument information parts, each instrument information part describing the parameters for synthesizing an audible signal the presentation instructions of which is described by a score information part;

compatibility information associated with said score information parts and instrument information parts, describing the compatibility of said score information parts and said instrument information parts with certain processing and storing capacity;

means for responding to a selection command by downloading a score information part and a instrument information part to terminal equipment through a communication network; and wherein said database of score information parts and said database of instrument information parts form a common database structure where each score information part is associated with at least one instrument information part to provide a sound packet structure, and said compatibility information is arranged to describe the compatibility of each sound packet with certain processing and storing capacity.

21. An arrangement according to claim 20, wherein said compatibility information is arranged to describe the compatibility of each sound packet with the processing and storing capacity of certain terminal types.

22. An arrangement according to claim 20, further comprising means for coupling selected score information parts and selected instrument information parts into a common sound packet structure for downloading.

23. An arrangement according to claim 20, further comprising means for encrypting selected score information parts and selected instrument information parts.

* * * * *